(12) United States Patent
Xie

(10) Patent No.: US 12,721,472 B2
(45) Date of Patent: Sep. 1, 2026

(54) CASING FOR OMNI-DIRECTIONALLY PROTECTING BAKING TRAY AND METHOD FOR PROTECTING BAKING TRAY SURFACE

(71) Applicant: Xinzhen Xie, Dongguan (CN)

(72) Inventor: Xinzhen Xie, Dongguan (CN)

( * ) Notice: Subject to any disclaimer, the term of this patent is extended or adjusted under 35 U.S.C. 154(b) by 0 days.

(21) Appl. No.: 18/386,609

(22) Filed: Nov. 3, 2023

(65) Prior Publication Data

US 2025/0143509 A1 May 8, 2025

(51) Int. Cl.
*A47J 37/01* (2006.01)
*A47J 36/06* (2006.01)

(52) U.S. Cl.
CPC ............... *A47J 37/01* (2013.01); *A47J 36/06* (2013.01)

(58) Field of Classification Search
CPC ......... A47J 37/01; A47J 36/06; A47J 36/022; A47J 36/16; A21B 3/131; A21B 3/138
USPC ................................ 220/573.4, 573.1, 23.87
See application file for complete search history.

(56) References Cited

U.S. PATENT DOCUMENTS 4,508,768 A * 4/1985 Kornely ................ A47J 36/022 206/520
4,756,445 A * 7/1988 Agee, Sr. .................. B65F 1/08 220/23.89
5,244,114 A * 9/1993 Traegde .................... A45F 3/16 206/315.3
2008/0015281 A1 * 1/2008 Holmes ................ A47J 36/025 525/101

* cited by examiner

*Primary Examiner* — Jeffrey R Allen
*Assistant Examiner* — Elizabeth J Volz
(74) *Attorney, Agent, or Firm* — Jose Cherson Weissbrot

(57) ABSTRACT

A casing for omni-directionally protecting a baking tray comprises a base and a frame skirt continuously formed around the outer periphery of the base, wherein the frame skirt is fixedly connected with the outer periphery of the base and comprises an outer side surface and an inner side surface, and the frame skirt has a roughly inverted U-shaped cross section; a method for protecting the surface of a baking tray, which provides a casing with a base and a frame skirt with a roughly U-shaped cross section. The method comprises the following steps: cleaning the surface of the baking tray, placing the base on the surface of the baking tray, and placing the frame skirt on the outer frame of the baking tray.

16 Claims, 16 Drawing Sheets

CASING FOR OMNI-DIRECTIONALLY PROTECTING BAKING TRAY AND METHOD FOR PROTECTING BAKING TRAY SURFACE

TECHNICAL FIELD

The present invention relates to the technical field of outdoor cookers, in particular to a casing for omni-directionally protecting a baking tray and a method for protecting the surface of the baking tray.

BACKGROUND

Baking tray is a cooking device, which consists of a wide plane heated by gas, electricity, wood or coal. It can be used for both residential and commercial purposes. In industrialized countries, the baking tray is usually a flat metal plate. Household metal plates are usually made of chrome steel, aluminum, cast iron or carbon steel. Most commercial grade metal plates are made of A36 steel, but some are stainless steel or composite materials of stainless steel and aluminum. Nowadays, many iron plates are coated with non-stick Teflon® coating.

Outdoor baking trays may be affected by the use and storage environment. Usually, baking trays are placed outdoors and often uncovered. Rain, wind, snow, sunlight and other environmental factors, as well as natural factors such as leaves, branches and other similar materials may cause damage to them. Metal surfaces may be oxidized (i.e. rusted), especially due to exposure to humid environment. Similarly, insects, rodents and other pests will also settle in the baking tray and on the surface of the baking tray, spreading waste and diseases.

However, the casing for protecting the baking tray in the market has the problem that the baking tray cannot be protected in all directions. Specifically, the periphery of the baking tray is not protected, and some baking trays have screws or other fixing pieces, which are not suitable for the casing for protecting the baking tray and cannot be protected. For example, a casing for protecting the baking tray disclosed in the US patent application No. 20220304509 has the problem that it is not suitable for the baking tray, and the periphery of the baking tray cannot be protected, and the periphery of the baking tray and the fixing parts are easily damaged by rain, wind, snow or other factors.

Therefore, it is necessary to put forward a new type of casing for protecting the baking tray, which is more suitable for the baking tray, protects the baking tray more comprehensively and gives users a better protection effect.

SUMMARY

The present invention provides a casing for omni-directionally protecting a baking tray, which comprises a base, wherein the base has a top surface and a smooth bottom surface, and the bottom surface is in contact with the upper surface of the baking tray; a frame skirt continuously formed around the outer periphery of the base, wherein the frame skirt is fixedly connected with the outer periphery of the base and comprises an outer side surface and an inner side surface, and the frame skirt has a roughly inverted U-shaped cross section.

The present invention provides a casing for omni-directionally protecting a baking tray, which comprises a base, wherein the base has a top surface and a bottom surface, and the bottom surface is in contact with the upper surface of the baking tray; a frame skirt continuously formed around the outer periphery of the base, wherein the frame skirt is fixedly connected with the outer periphery of the base and comprises an outer side surface and an inner side surface, wherein the frame skirt has a roughly inverted U-shaped cross section; the frame skirt comprises a first sidewall and a second sidewall corresponding to the first sidewall; wherein the first sidewall is provided with at least one screw groove, and the second sidewall is provided with at least one opening corresponding to the screw groove.

The present invention also provides a method for protecting the surface of a baking tray, including providing a casing for omni-directionally protecting a baking tray. The casing comprises a base and a frame skirt continuously formed around the outer periphery of the base, wherein the frame skirt is fixedly connected with the outer periphery of the base and has a roughly inverted U-shaped section, and the method comprises the following steps:

cleaning the surface of the baking tray;

placing the base on the surface of the baking tray;

wherein, the frame skirt is placed on an outer frame of the baking tray.

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

BRIEF DESCRIPTION OF DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

In the figures.

Figure 1:
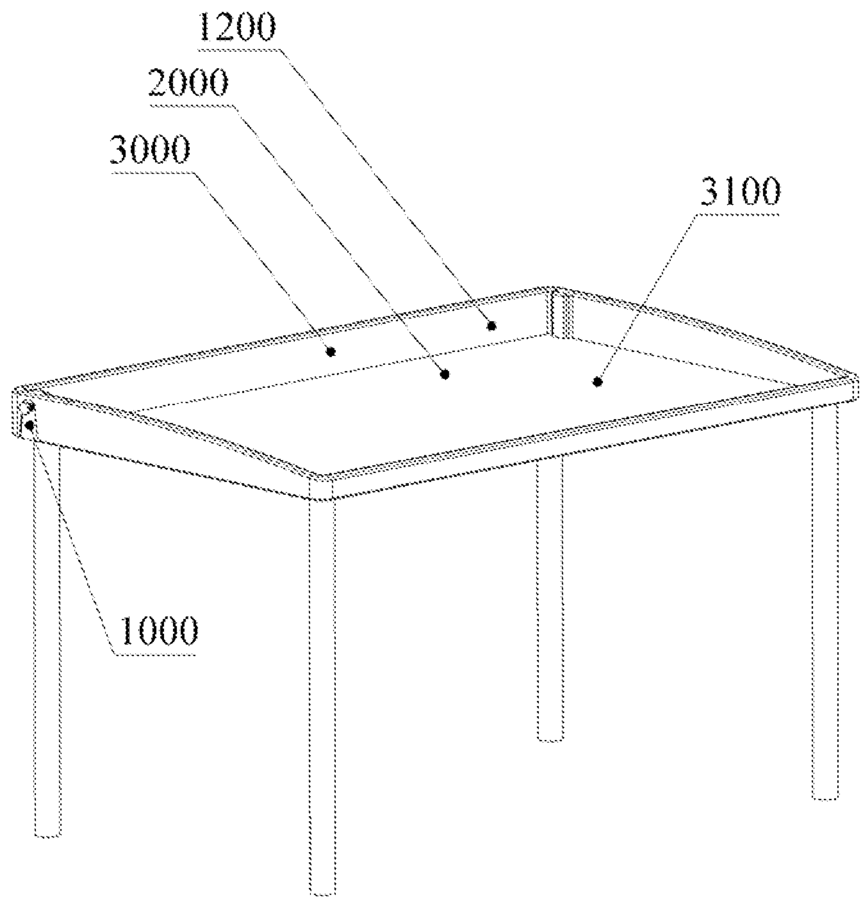
FIG. 1 is a schematic view of a baking tray and a casing for protecting the baking tray.

1000, Baking tray; 1100, Outer frame; 1110, First screw part; 1120, Second screw part; 1200 Casing for protecting a baking tray; 2000, Base; 2100, Top surface; 2200, Bottom surface; 3000, Frame skirt; 3100, Outer side; 3110, Inner side surface; 3200, First sidewall; 3210, Second sidewall; 3300, First skirt; 3310, Second skirt; 3320, Third skirt; 3330, Fourth skirt; 3400, First screw groove; 3410, First opening; 3500, Second screw groove; 3510, Second opening; 4000, Handle; 4100, Boss; 4200, Hook ring; 4300, Object receiving bag; 4400, Hook hole; 4500, Mold groove; 4600, Slope surface.

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

As shown in FIGS. 1 to 7, the present invention provides a casing 1200 for omni-directionally protecting a baking tray, including a base 2000, which has a top surface 2100 and a bottom surface 2200, wherein the bottom surface 2200 is in contact with the upper surface of the baking tray 1000; a frame skirt 3000 continuously formed around the outer periphery of the base 2000, wherein the frame skirt 3000 is fixedly connected with the outer periphery of the base 2000, including an outer side surface 3100 and an inner side surface 3110, wherein the frame skirt 3000 has a roughly inverted U-shaped cross section, wherein the inner side surface 3110 has a gloss treatment, and the frame skirt 3000 is configured to be placed on a baking tray.

In this embodiment, the top surface 2100 of the base 2000 is set as a matte surface. The matte surface may present a hydrophilic surface to better contain the liquid material placed thereon, and the matte surface may better fix the liquid material or other debris on the top surface 2100 of the casing 1200 for protecting the baking tray. Specifically, in this embodiment, the top surface 2100 of the base 2000 is formed into a matte surface by mechanical matte treatment. In some embodiments, the top surface 2100 of the base 2000 also forms a matte surface by matte paint.

In mechanical matte treatment, it is necessary to clean the surface first to remove impurities such as scratches, rust and dust, and then carry out rough grinding and medium grinding by manual or mechanical scraping to produce a relatively rough surface effect. Then, through pressing and uniform movement, the scratches and unevenness are further smoothed and uniform.

Matte paint is usually divided into two categories: semi-matte paint (gloss around 40-60) and all-sub (gloss below 30). The subdivision can be divided into various sub-sub-sub-paints ranging from three-thirds to eight-sub-sub-paints, that is, sub-paints ranging from 30 to 80.

In this embodiment, the top surface 2100 of the base 2000 is set as a matte surface. In other embodiments (not shown in the figure), the top surface of the base is not limited to a matte surface, but can also be a smooth surface, a frosted surface, an irregular surface and any desired surface.

In this embodiment, the bottom surface 2200 of the base 2000 and the inner side surface 3110 of the frame skirt 3000 are polished. In this embodiment, the bottom surface 2200 and the inner side surface 3110 are preferably treated with glossy surface, so that they can be sealed more easily and effectively when placed on the surface of the baking tray 1000, and can resist surface moisture and particle infiltration to the bottom surface 2200 and the inner side surface 3110, thus keeping the surface clean and being usable on the surface of the baking tray 1000.

Specifically, the bottom surface 2200 of the base 2000 and the inner side surface 3110 of the frame skirt 3000 preferably have the gloss of SPA Surface Finish A1 or A2. Of course, with the progress of technology, better gloss treatment can be used.

In this embodiment, the gloss treatment more effectively seals the bottom surface 2200 and the inner side surface 3110 of the baking tray 1000 to the surface of the baking tray 1000, thereby protecting the surface of the baking tray 1000 from the aforementioned environment and pest substances. Glossy treatment can effectively reduce the friction on its surface and reduce the burrs on the bottom surface 2200 and the inner side surface 3110 of the casing 1200 for protecting the baking tray, otherwise it will be easily contaminated with dust, debris and water without glossy treatment.

In this embodiment, the bottom surface 2200 and the inner side surface 3110 of the casing 1200 for protecting the baking tray are set as glossy surfaces. In other embodiments (not shown in the figure), the bottom surface and the inner side surface of the casing for protecting the baking tray are not limited to glossy surfaces, but can also be set as matte surfaces, rough surfaces, irregular surfaces and any desired surfaces.

In this embodiment, the bottom surface 2200 is in contact with the upper surface of the baking tray 1000, and the inner side surface 3110 is in contact with the outer frame 1100 of the baking tray 1000. In this embodiment, the casing 1200 for protecting the baking tray acts on the baking tray 1000. In practical use, it can also be used to protect other items, such as pans, woks, dishes and other items that meet the wishes.

As shown in FIGS. 1 to 7, in this embodiment, a frame skirt 3000 is continuously formed around the outer periphery of the base 2000, and the frame skirt 3000 is fixedly connected with the outer periphery of the base 2000. In other embodiments (not shown in the figure), the frame skirt and the base are not limited to fixed connection, but can also be detachably attached, elastically connected, rotatably connected and any desired connection mode.

In this embodiment, the frame skirt 3000 and the base 2000 are fixedly connected by integral molding. In other embodiments (not shown in the figure), the frame skirt and the base are not limited to being fixedly connected by integral molding, but also can be connected by screws, pins, rivets and the like.

As shown in FIGS. 1 to 7, in this embodiment, the frame skirt 3000 has a substantially inverted U-shaped cross section. In other embodiments (not shown in the figure), the frame skirt is not limited to having a roughly inverted U-shaped cross section, but can also be set to have a rectangle, a triangle, a circle, an ellipse and any desired geometric shape.

Figure 2:
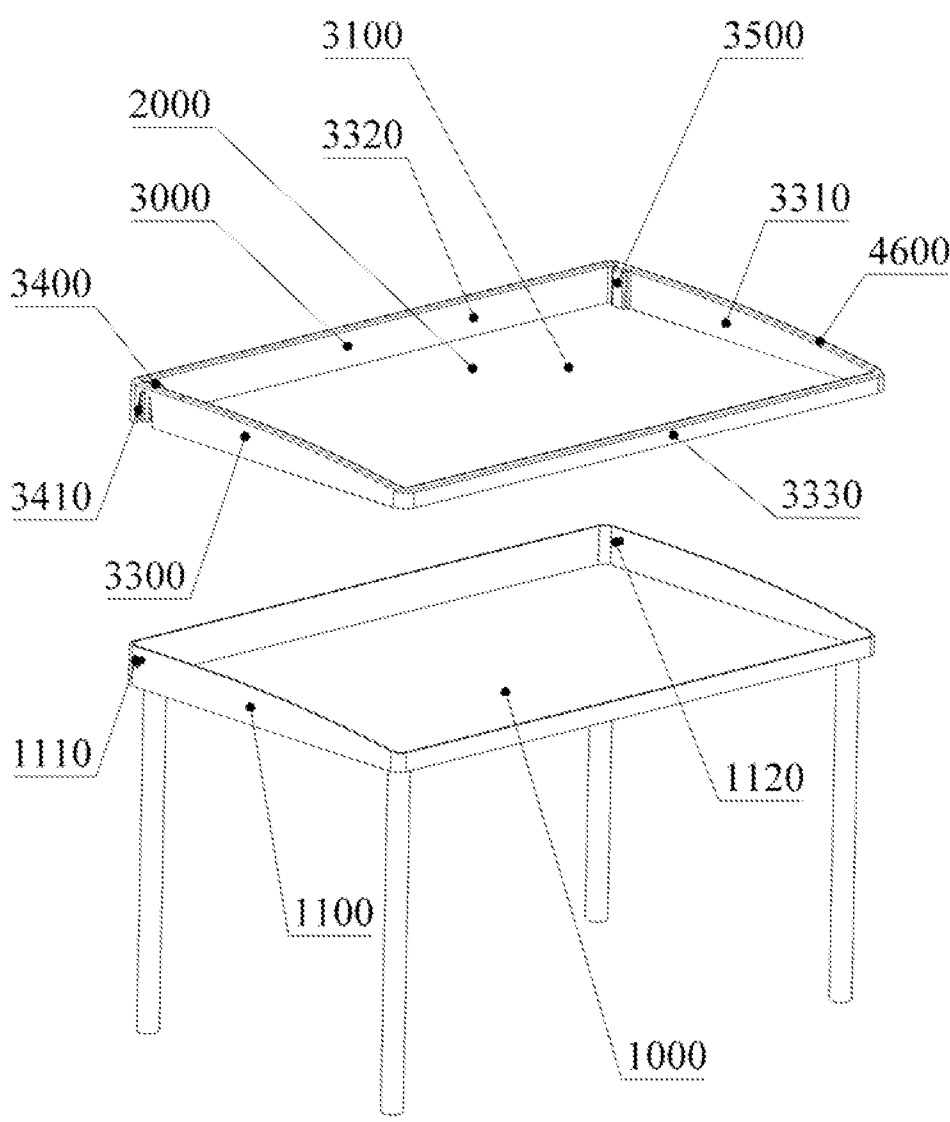
FIG. 2 is an exploded view of FIG. 1.
Figure 3:
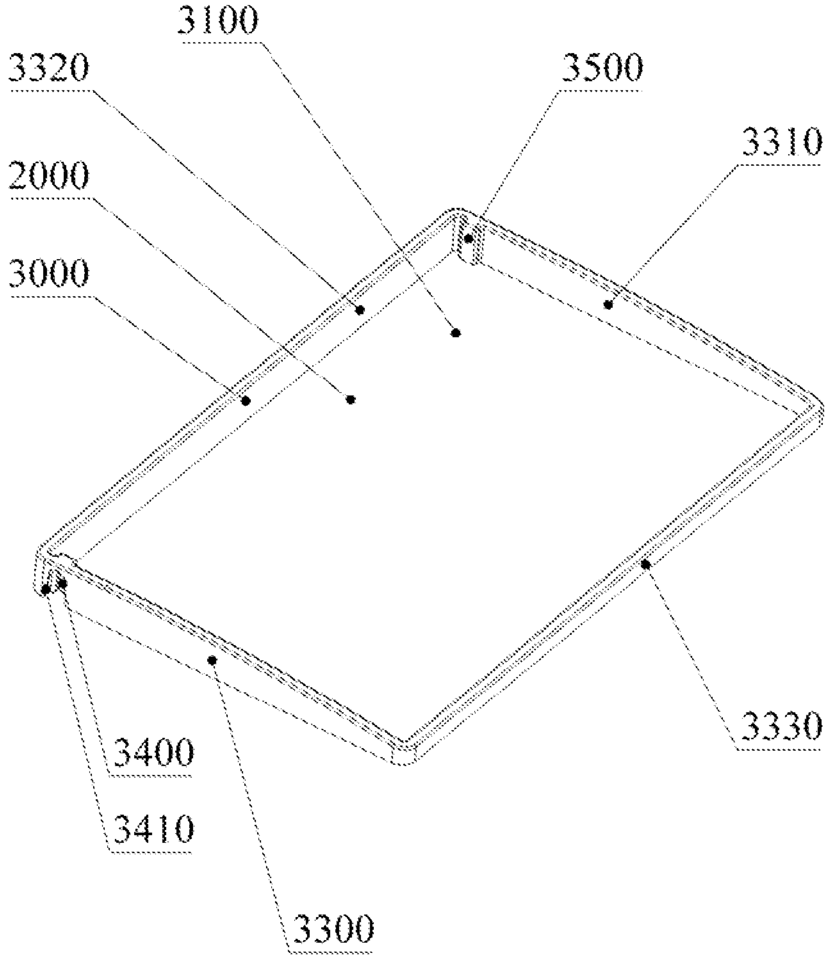
FIG. 3 is a schematic view of a casing for protecting a baking tray.
Figure 4:
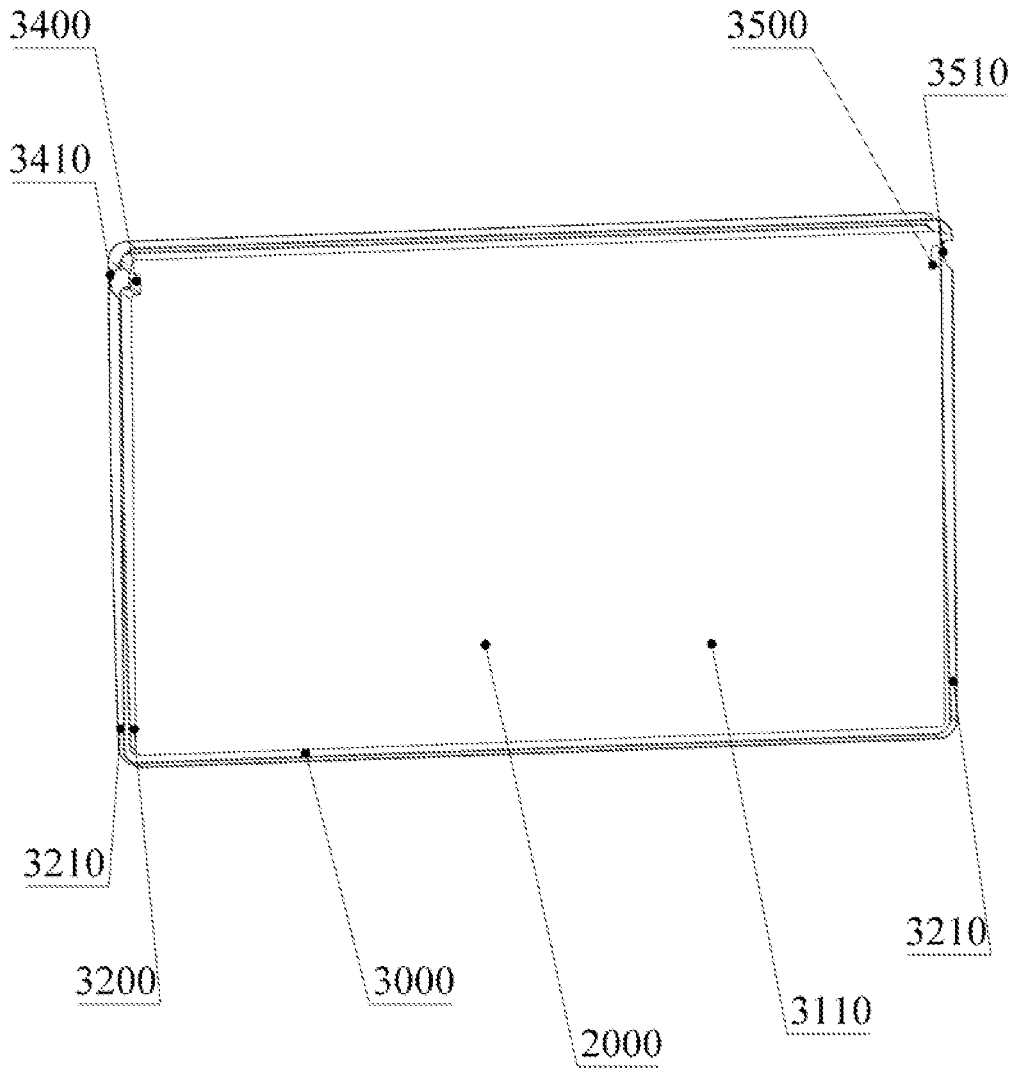
FIG. 4 is another schematic view of the casing for protecting the baking tray.
Figure 5:
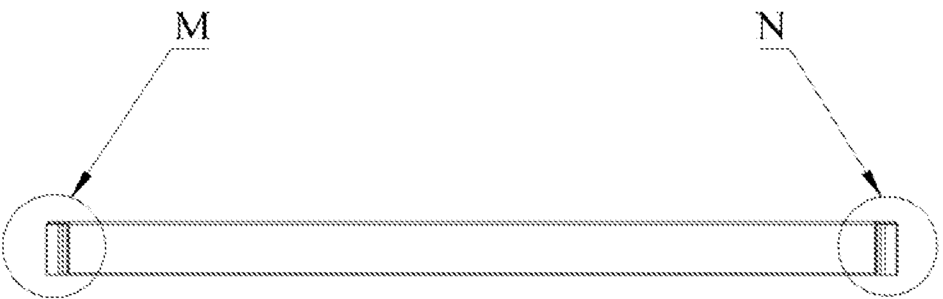
FIG. 5 is a cross-sectional view of the casing for protecting the baking tray.
Figure 6:
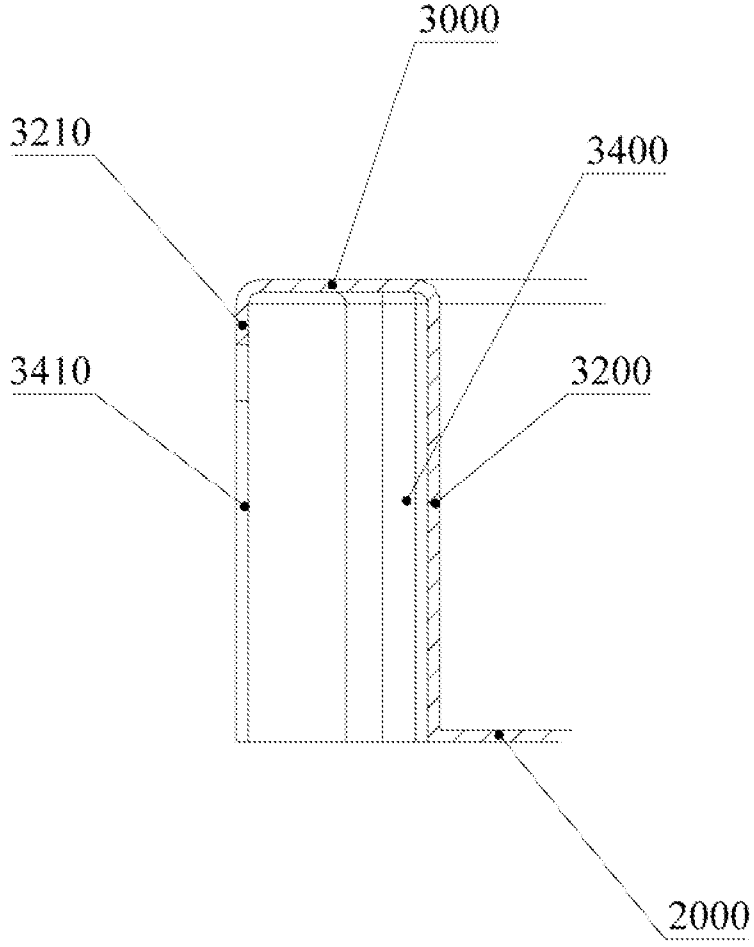
FIG. 6 is a schematic diagram of m in FIG. 5.
Figure 7:
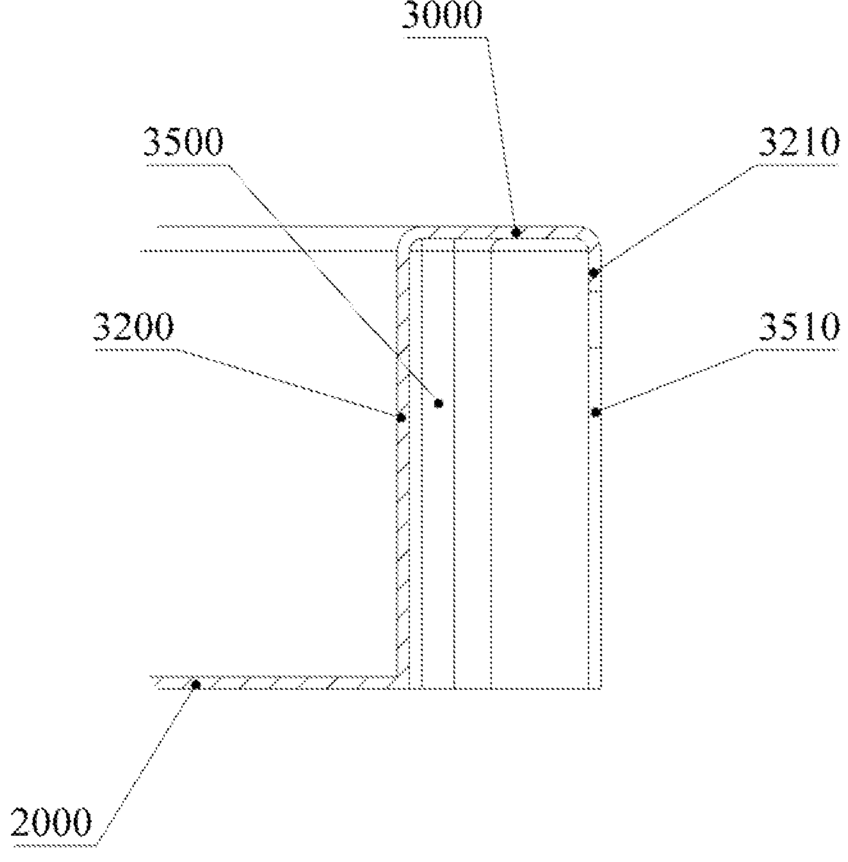
FIG. 7 is a schematic diagram of n in FIG. 5.
Figure 16:
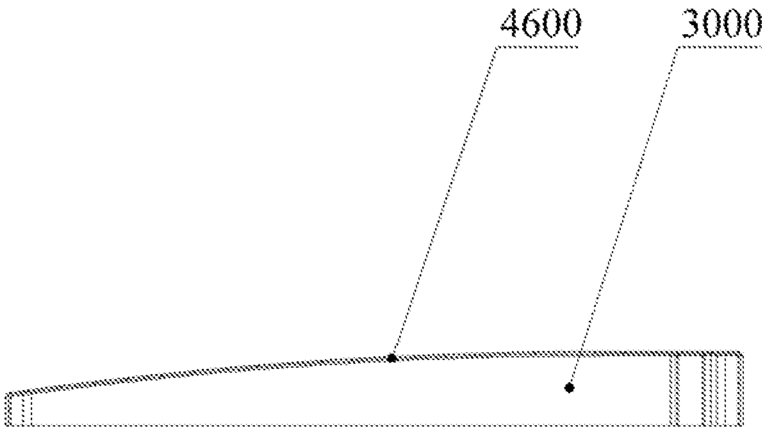
FIG. 16 is a fourth cross-sectional view of the casing for protecting the baking tray.

As shown in FIGS. 2 and 16, in this embodiment, the frame skirt 3000 has a slope surface 4600. In this embodiment, the outer frame 1100 of the baking tray 1000 has a slope shape, the frame skirt 3000 is formed with a slope surface 4600 corresponding to the slope shape of the outer frame 1100, and the frame skirt 3000 has a slope section with a certain inclination angle. In other embodiments (not shown in the figure), the frame skirt 3000 is not limited to having a slope surface, but may also have a flat surface, a curved surface, a serrated surface and any surface corresponding to the outer frame shape of the baking tray as desired.

In this embodiment, the base 2000 is formed of an elastic material, and the elastic material is silica gel. Specifically, the casing 1200 for protecting the baking tray is made of high-strength silica gel material meeting food safety standards. In other embodiments (not shown in the figure), the elastic material is not limited to silica gel, but can also be made of polylactic acid, polylactic acid copolymer, epoxy resin and other materials as desired.

In this embodiment, the durometer Shore A hardness of the elastic material is between about 30 and about 80. The casing 1200 for protecting the baking tray can be made of flexible and elastic materials, preferably high-strength silica gel materials meeting food safety standards. In this embodiment, the thickness of the casing 1200 for protecting the baking tray is preferably about 2.5 mm. In other embodiments, the thickness of the casing 1200 for protecting the baking tray is not limited to 2.5 mm, but can also be set to 3 mm, 5 mm, 1 cm and other arbitrary thicknesses. In other embodiments, the Shore A hardness of the elastic material is not limited to between about 30 and about 80, but can also be set between 20 and 50, between 70 and 120, and any desired range.

Figure 8:
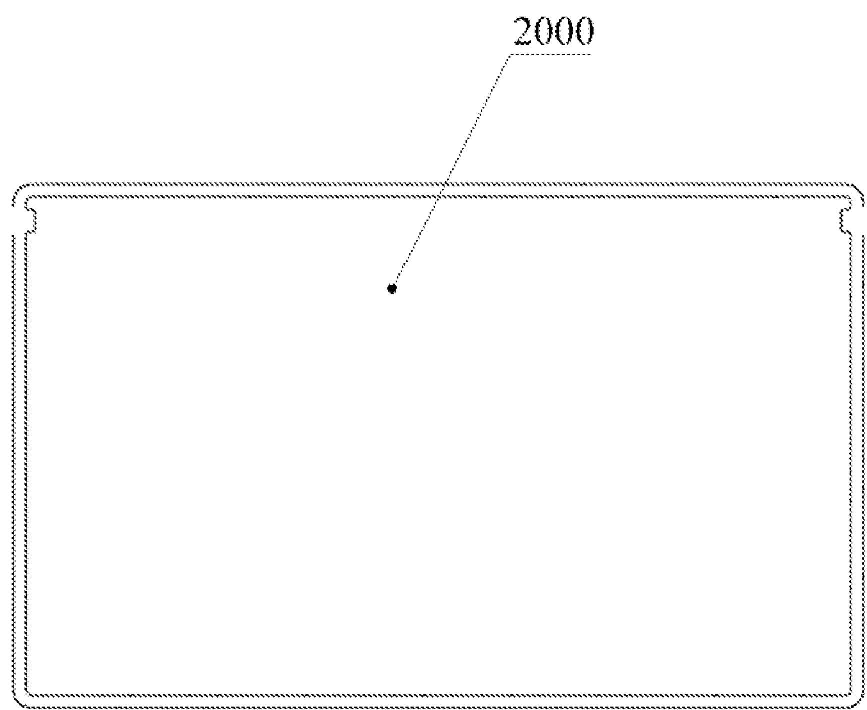
FIG. 8 is a second cross-sectional view of the casing for protecting the baking tray.

As shown in FIG. 8, in this embodiment, the base 2000 is arranged in a substantially rectangular shape. In other embodiments (not shown in the figure), the base is not limited to being roughly rectangular, but can also be roughly triangular, circular, elliptical and any desired geometric shape.

Figure 9:
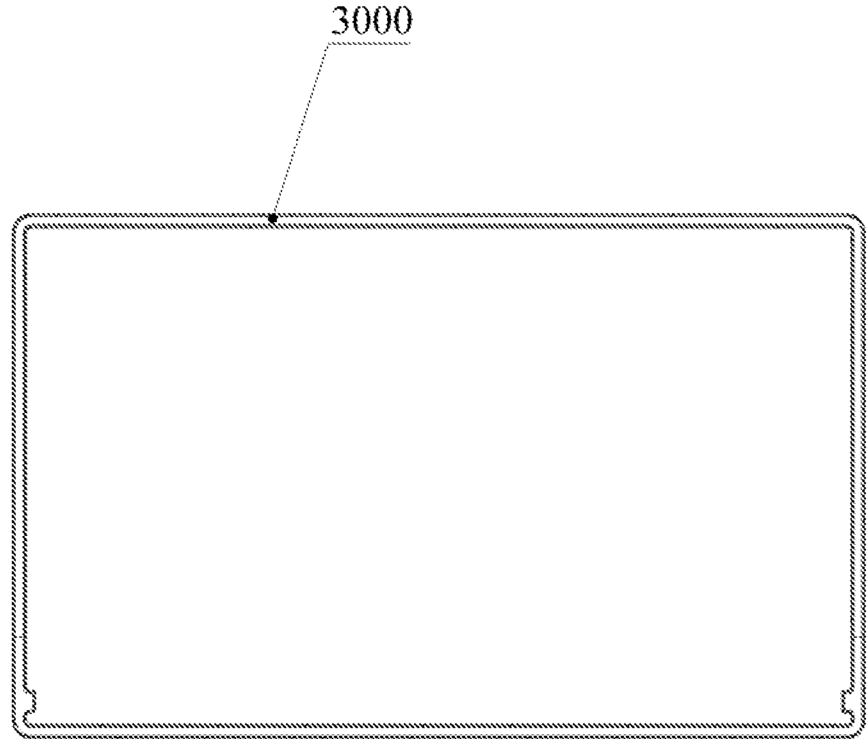
FIG. 9 is a third sectional view of the casing for protecting the baking tray.

As shown in FIG. 9, in this embodiment, the frame skirt 3000 has a substantially rectangular annular cross section. In other embodiments (not shown in the figure), the frame skirt is not limited to the circular cross section which is generally rectangular, but also can be generally triangular, circular, elliptical and any desired geometric cross section.

As shown in FIGS. 1 to 7, in this embodiment, the frame skirt 3000 includes a first sidewall 3200 and a second sidewall 3210 corresponding to the first sidewall 3200; the first sidewall 3200 is provided with at least one screw groove, and the second sidewall 3210 is provided with at least one first opening 3410 corresponding to the screw groove.

Specifically, the frame skirt 3000 includes a first skirt 3300, a second skirt 3310, a third skirt 3320 and a fourth skirt 3330 opposite to the first skirt 3300. Among them, the first sidewall 3200 of the first skirt 3300 is provided with a first screw groove 3400, and the second sidewall 3210 of the first skirt 3300 is provided with a first opening 3410 corresponding to the first screw groove 3400, wherein the first sidewall 3200 of the second skirt 3310 is provided with a second screw groove 3500 corresponding to the first screw groove 3400.

In this embodiment, the first screw groove 3400 and the first opening 3410, and the second screw groove 3500 and the second opening 3510 are respectively arranged on the first skirt 3300 and the second skirt 3310. In other embodiments (not shown in the figure), the first screw groove and the first opening, and the second screw groove and the second opening are not limited to being arranged on the first skirt and the second skirt, but can also be arranged together on the first skirt, on the first skirt and the third skirt, and at any other desired position.

In this embodiment, the baking tray has a first screw part 1110 and a second screw part 1120, wherein the first opening 3410 and the first screw groove 3400 are configured to be placed on the first screw part 1110; The second opening 3510 and the second screw groove 3500 are configured to be placed on the second screw part 1120.

Figure 10:
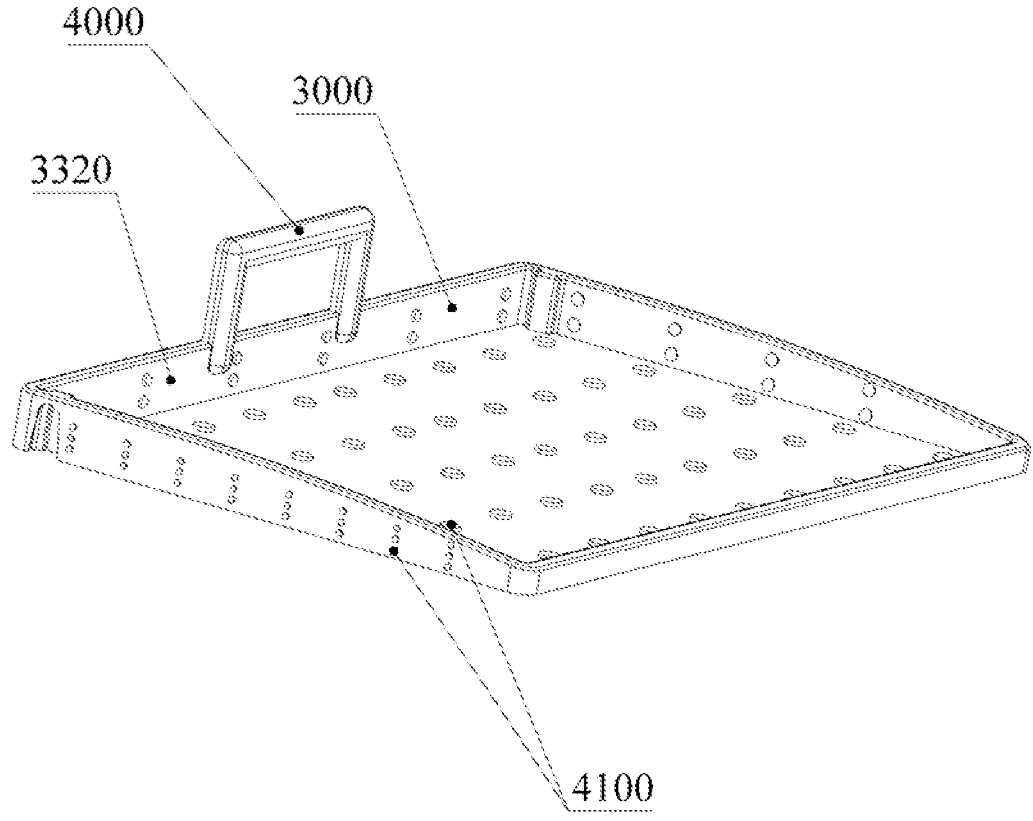
FIG. 10 is a schematic diagram of another embodiment 1 of FIG. 1.

As shown in FIG. 10, in another embodiment of the present invention, the frame skirt 3000 is provided with a handle 4000. Specifically, the handle 4000 is disposed on the third skirt 3320. The handle 4000 can facilitate the user to take the casing 1200 for protecting the baking tray. In some embodiments, the handle 4000 is also provided with anti-slip patterns and a shape that conforms to the grip of a human hand. In other embodiments (not shown in the figure), the handle is not limited to the third skirt, but can also be arranged on the first skirt, the second skirt, the base, the fourth skirt and any desired position.

As shown in FIG. 10, in this embodiment, the frame skirt 3000 and the base 2000 are provided with bosses 4100. Specifically, in this embodiment, the boss 4100 is arranged in a circular shape. The arrangement of the boss 4100 can improve the aesthetics of the product. In other embodiments (not shown in the figure), the boss is not limited to being circular, but can also be triangular, rectangular, elliptical and any desired geometric shape.

Figure 11:
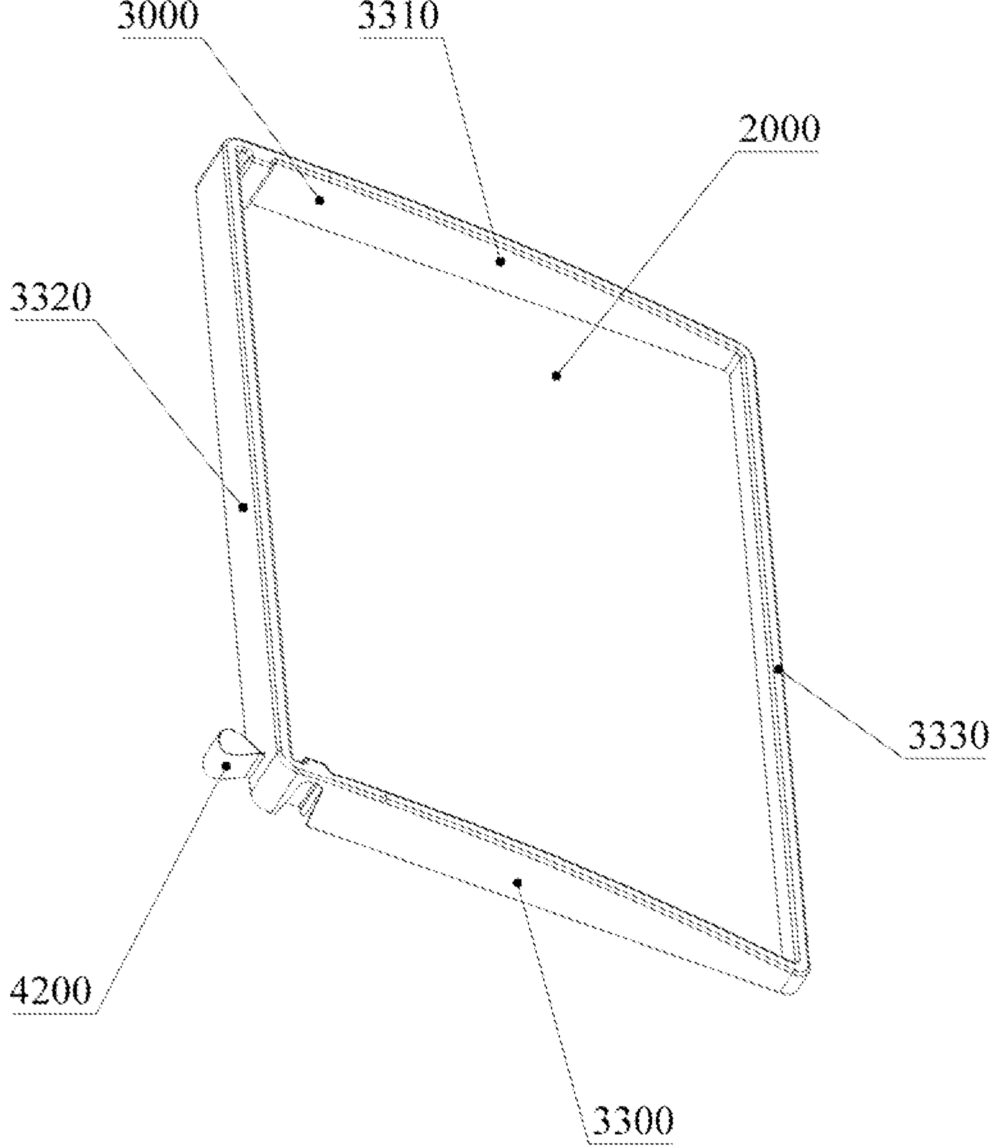
FIG. 11 is a schematic diagram of another embodiment 2 of FIG. 1.

As shown in FIG. 11, in another embodiment of the present invention, the frame skirt 3000 is provided with a hook ring 4200. Specifically, the hook ring 4200 is disposed at one end of the third skirt 3320. The hook ring 4200 allows the user to more conveniently store the casing 1200 for protecting the baking tray when not in use. In other embodiments (not shown in the figure), the hook ring is not limited to one end of the third skirt, but can also be arranged on the first skirt, the second skirt, the base, the fourth skirt and any desired position.

Figure 12:
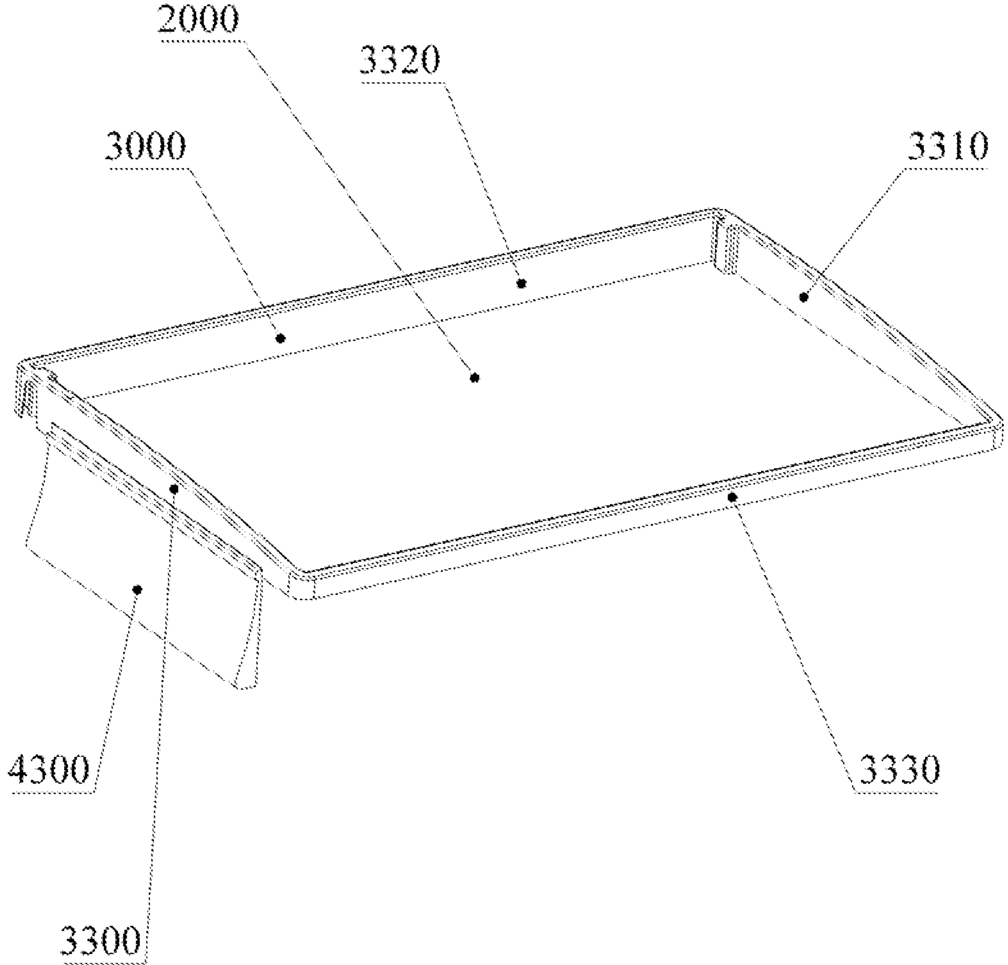
FIG. 12 is a schematic diagram of another embodiment 3 of FIG. 1.

As shown in FIG. 12, in another embodiment of the present invention, the frame skirt 3000 is provided with an object receiving bag 4300. Specifically, the object receiving bag 4300 is disposed on the first skirt 3300, and the receiving bag 4300 is made of flexible elastic material. The object receiving bag 4300 can be used to store other cookware, which is convenient for users to store other cookware supplies.

In this embodiment, the object receiving bag 4300 is arranged on the first skirt 3300. In other embodiments (not shown in the figure), the bag is not limited to the first skirt, but can also be arranged on the second skirt, the third skirt, the fourth skirt and any desired position. In this embodiment, the object receiving bag 4300 is formed of silica gel. In some embodiments, the bag can also be made of plastic, wood, metal and any desired material.

Figure 13:
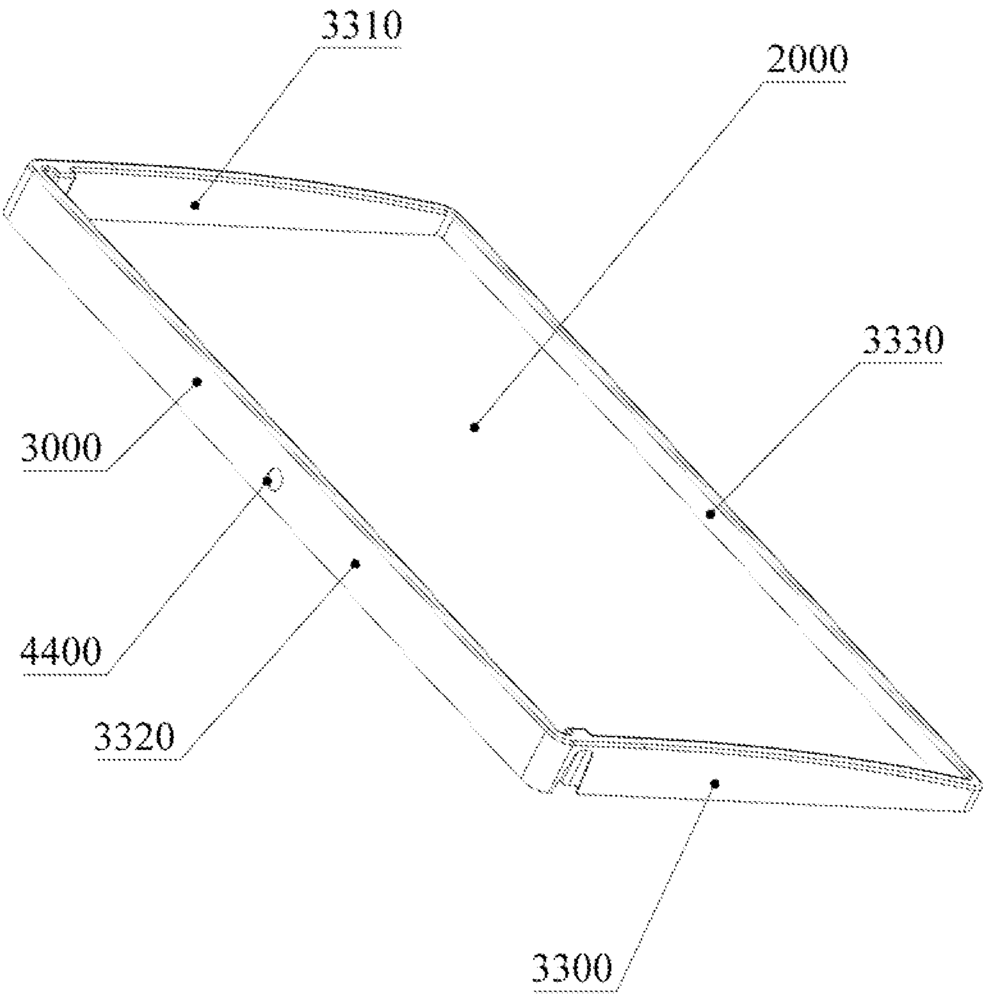
FIG. 13 is a schematic diagram of another embodiment 4 of FIG. 1.

As shown in FIG. 13, in another embodiment of the present invention, the frame skirt 3000 is provided with a hook hole 4400. Specifically, the hook hole 4400 is provided on the third skirt 3320. The hook hole 4400 can facilitate the user to receive the casing of the protective oven. In other embodiments (not shown in the figure), the hook holes are not limited to the third skirt, but can also be arranged on the first skirt, the second skirt, the base, the fourth skirt and any desired position.

Figure 14:
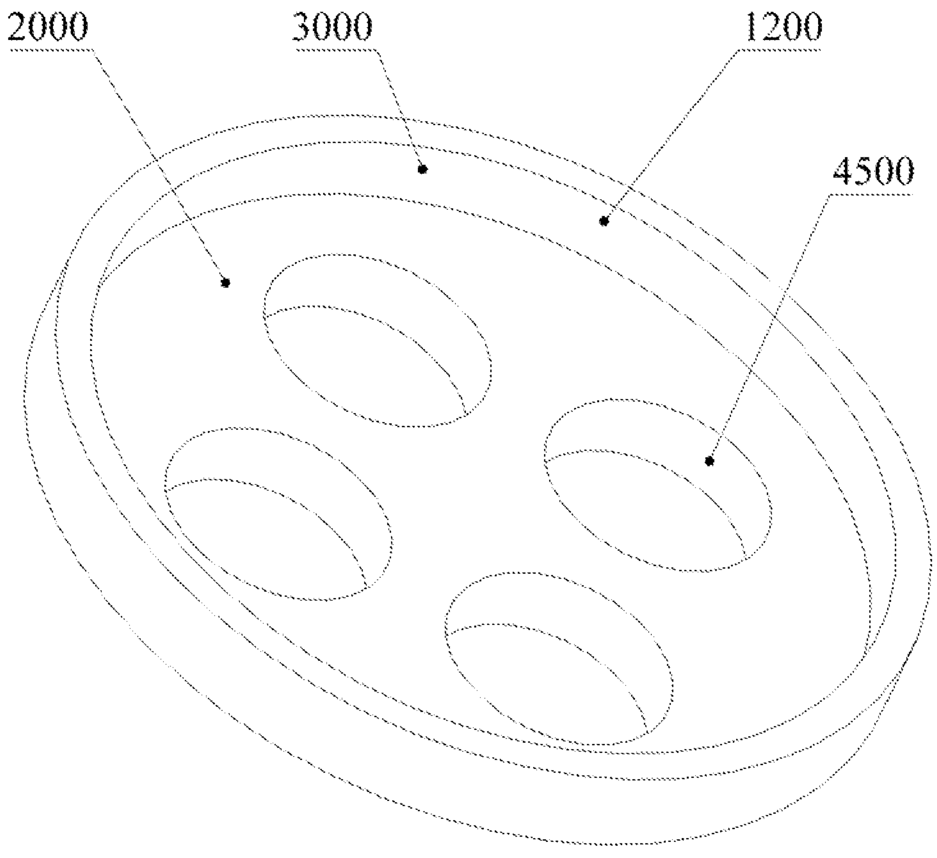
FIG. 14 is a schematic diagram of another embodiment 5 of FIG. 1.
Figure 15:
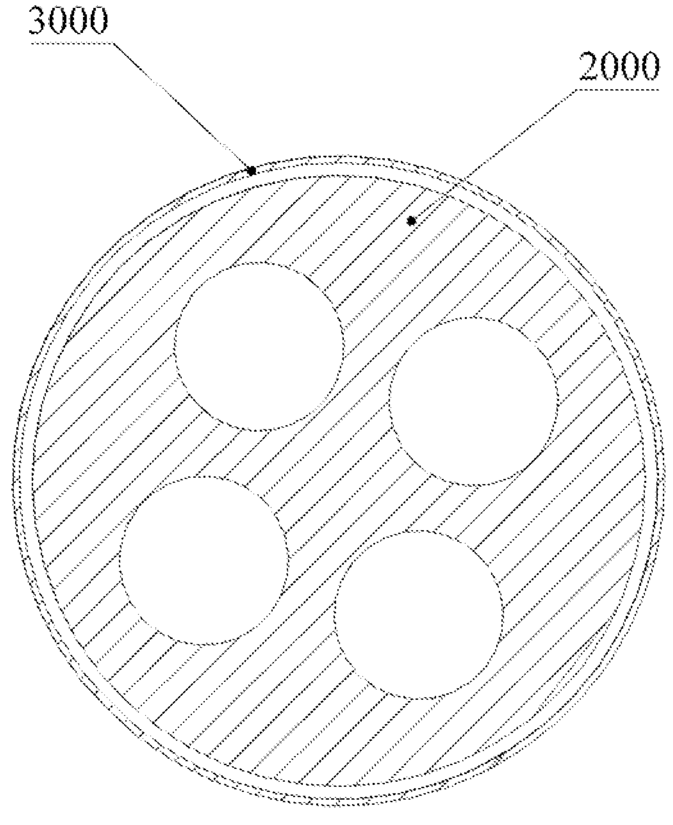
FIG. 15 is a sectional view of FIG. 13.

As shown in FIGS. 14 to 15, in another embodiment of the present invention, the base 2000 is arranged in a substantially circular shape, and the frame skirt 3000 has a substantially circular annular cross section, and the base 2000 is provided with at least one mold groove 4500. In order to adapt to the fact that some baking trays are provided with molds, the present invention is provided with mold grooves for protecting the molds, thereby better protecting the baking trays.

Specifically, in this embodiment, four circular mold grooves 4500 are provided. In other embodiments (not shown in the figure), it is not limited to four circular mold grooves, but also can be set to one, two, three, five and any desired number, and can also be set to ellipse, triangle, rectangle and any desired geometric shape.

The present invention also provides a casing for omni-directionally protecting a baking tray, which comprises a base and a frame skirt continuously formed around the outer periphery of the base, wherein the frame skirt is fixedly connected with the outer periphery of the base and has a roughly inverted U-shaped cross section;

wherein the frame skirt comprises a first sidewall and a second sidewall corresponding to the first sidewall;

wherein the first sidewall is provided with at least one screw groove, and the second sidewall is provided with at least one opening corresponding to the screw groove;

wherein the baking tray is provided with at least one screw part;

the method comprises the following steps:

cleaning the baking tray;

placing a base on the surface of the baking tray;

wherein, the frame skirt is placed on the outer frame of the baking tray;

wherein an opening and a screw groove are placed on the screw part.

when cleaning the casing for protecting the baking tray, the steps are as follows: dissolve the detergent in water to soak the casing for protecting the baking tray for about 15 minutes to 2 hours, then gently wash the casing for protecting the baking tray with a rag, and then rinse it with clear water to dry it.

In this embodiment, after the baking tray is cooled and cleaned, the bottom or glossy surface of the baking tray can be put down on the baking tray and kept on the baking tray during non-use and/or storage. It is best to coat the baking tray surface with a layer of oil, especially food-grade oil, before placing the baking tray protective casing, which will help seal the baking tray protective casing on the baking tray surface and protect the baking tray protective casing from oxidation due to contact with water, dust, insect debris or other similar destructive substances. Of course, before heating the surface of the baking tray, the protective casing of the baking tray should be removed from the baking tray surface.

The technical means disclosed in the scheme of the present invention are not limited to the technical means disclosed in the above embodiments, but also include the technical scheme composed of any combination of the above technical features. It should be pointed out that for those skilled in the art, several improvements and embellishments can be made without departing from the principle of the present invention, and these improvements and embellishments are also regarded as the protection scope of the present invention.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A casing for omni-directionally protecting a baking tray, comprising:

- a base having a top surface and a bottom surface, wherein the bottom surface is in contact with an upper surface of the baking tray; and
- a frame skirt continuously formed around an outer periphery of the base, wherein the frame skirt is fixedly connected with the outer periphery of the base and comprises an outer side surface and an inner side surface, and the frame skirt has a roughly inverted U-shaped cross section,
- wherein the frame skirt comprises a first sidewall and a second sidewall corresponding to the first sidewall, and
- wherein the first sidewall is provided with:
  - at least one screw groove extending vertically and partially along the first sidewall, and
  - a partial non-opened portion above the at least one screw groove; and
- wherein the second sidewall is provided with at least one opening extending vertically and entirely along the second sidewall, and
- wherein the first sidewall is correspondingly arranged to the second sidewall to align the at least one screw groove having the partial non-opened portion above the at least one groove with the at least one opening.

2. The casing for omni-directionally protecting the baking tray according to claim 1, wherein the inner side surface and the bottom surface have gloss finish.

3. The casing for omni-directionally protecting the baking tray according to claim 1, wherein the top surface has a matte finish.

4. The casing for omni-directionally protecting the baking tray according to claim 1, wherein the base is arranged in a substantially rectangular shape.

5. The casing for omni-directionally protecting the baking tray according to claim 1, wherein the frame skirt has a substantially rectangular annular section.

6. The casing for omni-directionally protecting the baking tray according to claim 1, wherein the frame skirt has a slope surface.

7. The casing for omni-directionally protecting the baking tray according to claim 1, wherein the base is made of an elastic material, and the elastic material is silica gel.

8. The casing for omni-directionally protecting the baking tray according to claim 1, wherein the base is arranged in a substantially circular shape, and the frame skirt has a substantially circular annular cross section.

9. The casing for omni-directionally protecting the baking tray according to claim 1, wherein the base is provided with at least one mold groove.

10. A casing for omni-directionally protecting a baking tray, the baking tray is provided with a screw part, the casing for omni-directionally protecting the baking tray comprising:

- a base having a top surface and a bottom surface, wherein the bottom surface is in contact with an upper surface of the baking tray; and
- a frame skirt continuously formed around an outer periphery of the base, wherein the frame skirt is fixedly connected with the outer periphery of the base and comprises an outer side surface and an inner side surface, wherein the frame skirt has a roughly inverted U-shaped cross section; and
- the frame skirt comprises a first sidewall and a second sidewall corresponding to the first sidewall; and
- wherein the first sidewall is provided with:
  - at least one screw groove extending vertically and partially along the first sidewall, and
  - a partial non-opened portion above the at least one screw groove; and
- wherein the second sidewall is provided with:
  - at least one opening extending vertically and entirely along the second sidewall,
- wherein the first sidewall is correspondingly arranged to the second sidewall to align the at least one screw groove with the at least one opening to receive the screw part horizontally extending from the baking tray, and supporting the screw part on the partial non-opened portion.

11. The casing for omni-directionally protecting a baking tray according to claim 10, wherein the base is made of an elastic material, and the elastic material is silica gel with a Shore A hardness in between about 30 and about 80.

12. The casing for omni-directionally protecting a baking tray according to claim 10, wherein the frame skirt is provided with a handle.

13. The casing for omni-directionally protecting a baking tray according to claim 10, wherein the frame skirt and the base are provided with bosses.

14. The casing for omni-directionally protecting a baking tray according to claim 10, wherein the frame skirt is provided with a hook ring.

15. The casing for omni-directionally protecting a baking tray according to claim 10, wherein the frame skirt is provided with an object receiving bag.

16. The casing for omni-directionally protecting a baking tray according to claim 10, wherein the frame skirt and the base are fixedly connected by integral molding.

* * * * *